United States Patent
Kano

(10) Patent No.: US 8,302,952 B2
(45) Date of Patent: Nov. 6, 2012

(54) SHEET FEEDING APPARATUS, IMAGE READING APPARATUS AND IMAGE FORMING APPARATUS

(75) Inventor: Hiromi Kano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 6 days.

(21) Appl. No.: 12/801,003

(22) Filed: May 17, 2010

(65) Prior Publication Data

US 2010/0295233 A1 Nov. 25, 2010

(30) Foreign Application Priority Data

May 19, 2009 (JP) ................................ 2009-121027

(51) Int. Cl.
*B65H 85/00* (2006.01)
(52) U.S. Cl. ....................................... 271/3.14; 399/367
(58) Field of Classification Search ................. 271/3.14, 271/3.18, 4.01, 4.05, 4.07, 4.08, 4.1, 10.01, 271/10.06, 10.08, 10.09, 10.11, 264; 399/367; 358/1.12
See application file for complete search history.

(56) References Cited

U.S. PATENT DOCUMENTS

| | | | | |
|---|---|---|---|---|
| 7,021,618 | B2 * | 4/2006 | Watanabe et al. | 271/3.14 |
| 7,950,658 | B2 * | 5/2011 | Kotaka | 271/264 |
| 2004/0263921 | A1 * | 12/2004 | Iwago | 358/498 |
| 2006/0071386 | A1 * | 4/2006 | Mizubata et al. | 271/3.14 |
| 2007/0223063 | A1 * | 9/2007 | Liu et al. | 358/498 |

FOREIGN PATENT DOCUMENTS

| | | | |
|---|---|---|---|
| JP | 2001-235909 A | | 8/2001 |
| JP | 2002-014495 A | | 1/2002 |
| JP | 2005-020667 A | | 1/2005 |
| JP | 2007-186281 | * | 7/2007 |
| JP | 2009-044521 A | | 2/2009 |

* cited by examiner

*Primary Examiner* — Gerald McClain
*Assistant Examiner* — Thomas Morrison
(74) *Attorney, Agent, or Firm* — Rabin & Berdo, P.C.

(57) ABSTRACT

A sheet feeding apparatus includes a first feeding member that feeds a sheet along a predetermined feeding path, and a second feeding member that further feeds the sheet along the feeding path. The second feeding member is provided on a downstream side of the first feeding member along the feeding path. A sheet guide for guiding the sheet is provided between the first and second feeding members along the feeding path. The sheet feeding apparatus further includes a sheet holding member that holds the sheet against the sheet guide, and a biasing assisting member that applies a biasing force to the sheet holding member by means of the sheet which is fed between the first and second feeding members. The biasing force assists the sheet holding member to hold the sheet against the sheet guide.

15 Claims, 7 Drawing Sheets

SHEET FEEDING APPARATUS, IMAGE READING APPARATUS AND IMAGE FORMING APPARATUS

BACKGROUND OF THE INVENTION

The present invention relates to an image reading apparatus, and an image forming apparatus such as a copier, complex machine or facsimile machine having the image reading apparatus, and relates to a sheet feeding apparatus used therein.

Generally, an image forming apparatus such as a copier, complex machine, facsimile machine or the like has an image reading apparatus for reading a document. The conventional image reading apparatus includes a document reading sensor and a document holding member provided along a feeding path of the document. The document holding member holds the document (which is fed along the feeding path) against the document reading sensor while the document reading sensor reads the document. For this purpose, a spring is provided for biasing the document holding member against the document reading sensor. Such an image reading apparatus is disclosed in, for example, Japanese Laid-Open Patent Publication No. 2009-44521 (paragraphs 0021-0024, FIG. 2).

Recently, there is a need to prevent erroneous reading so as to improve image reading quality.

SUMMARY OF THE INVENTION

The present invention is intended to provide a sheet feeding apparatus, an image reading apparatus and an image forming apparatus capable of preventing erroneous reading.

The present invention provides a sheet feeding apparatus including a first feeding member that feeds a sheet along a predetermined feeding path, and a second feeding member that further feeds the sheet along the feeding path. The second feeding member is provided on a downstream side of the first feeding member along the feeding path. A sheet guide for guiding the sheet is provided between the first and second feeding members along the feeding path. The sheet feeding apparatus further includes a sheet holding member that holds the sheet against the sheet guide, and a biasing assisting member that applies a biasing force to the sheet holding member by means of the sheet which is fed between the first and second feeding members. The biasing force assists the sheet holding member to hold the sheet against the sheet guide.

With such a configuration, it becomes possible to prevent erroneous reading and to improve image reading quality.

The present invention also provides an image reading apparatus including a first feeding member that feeds a document along a predetermined feeding path, and a second feeding member that further feeds the document along the feeding path. The second feeding member is provided on a downstream side of the first feeding member along the feeding path. The image reading apparatus further includes a document reading unit that reads the document at a document reading position defined in the feeding path between the first and second feeding members. The image reading apparatus further includes a sheet holding member that holds the document against a sheet guide at the document reading position, and a biasing assisting member that applies a biasing force to the sheet holding member by means of the document which is fed between the first and second feeding members. The biasing force assists the sheet holding member to hold the document against the sheet guide.

The present invention also provides an image forming apparatus including a sheet placing portion for placing a sheet thereon, a sheet supplying portion that supplies the sheet from the sheet placing portion, the above described sheet feeding apparatus, and a sheet ejection portion for ejecting the sheet.

The present invention also provides an image forming apparatus including the above described image reading apparatus, and an image forming unit that forms an image on a sheet.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Hereinafter, embodiments of the present invention will be described with reference to drawings. The present invention is not limited to the embodiment described below, and modifications and improvements may be made to the invention without departing from the spirit and scope of the invention.

First Embodiment

Figure 1:
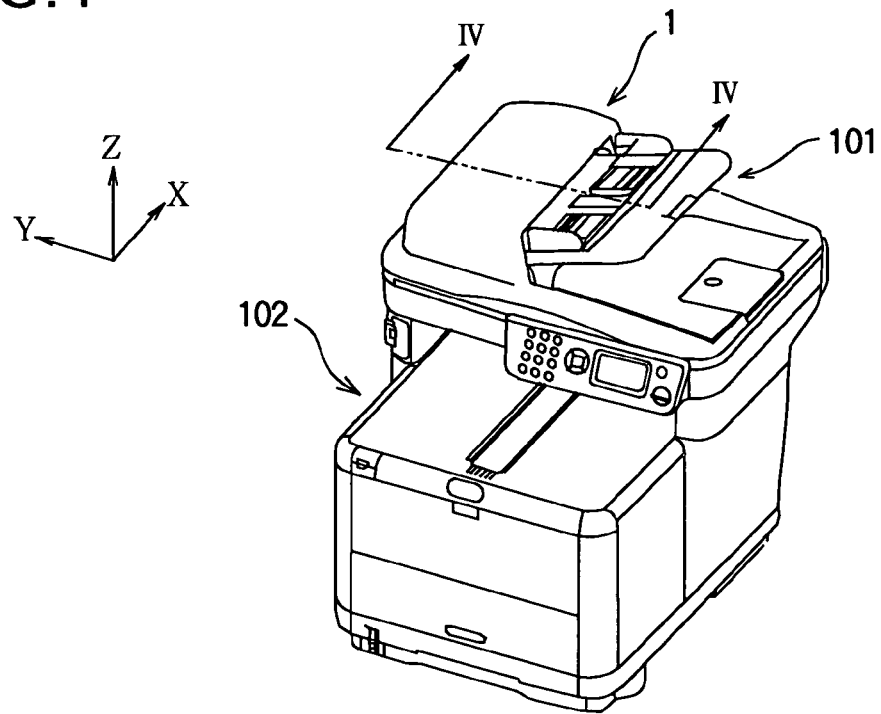
FIG. 1 is a perspective view showing an outer configuration of an image forming apparatus including an image reading apparatus according to the first embodiment of the present invention.
Figure 2:
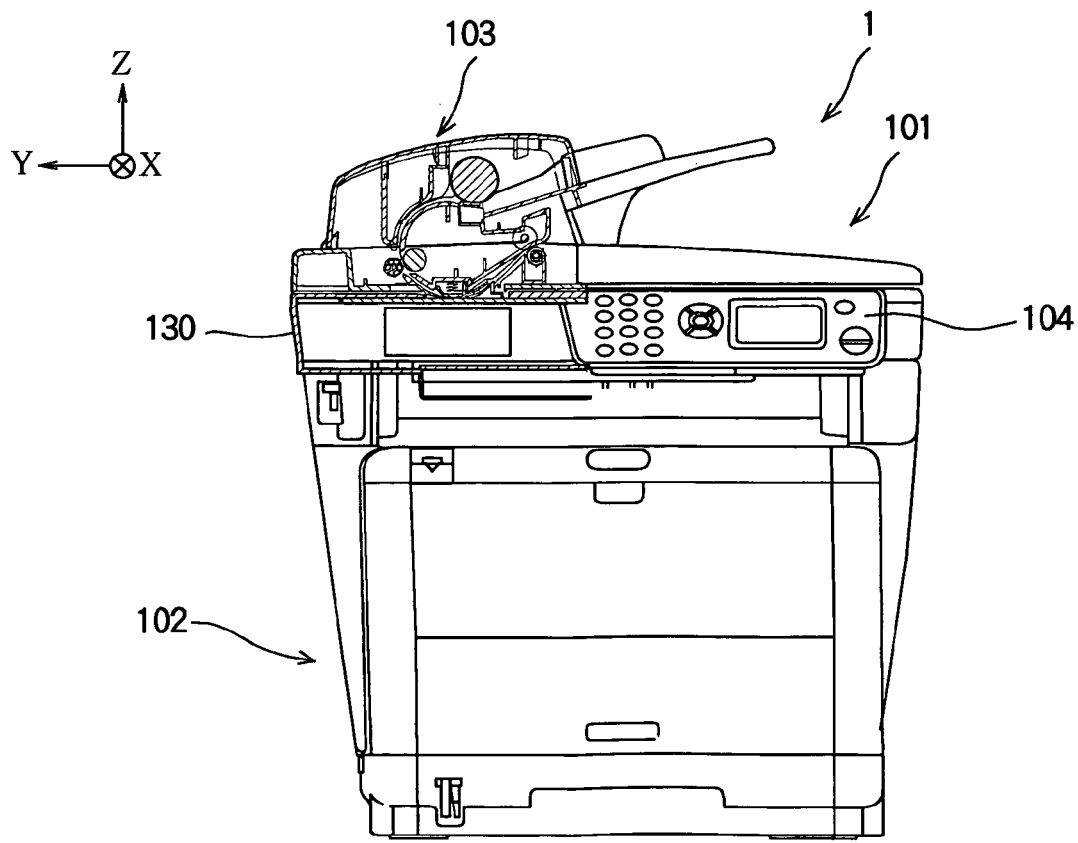
FIG. 2 is a partially cutaway side view of the image forming apparatus of FIG. 1.
Figure 3:
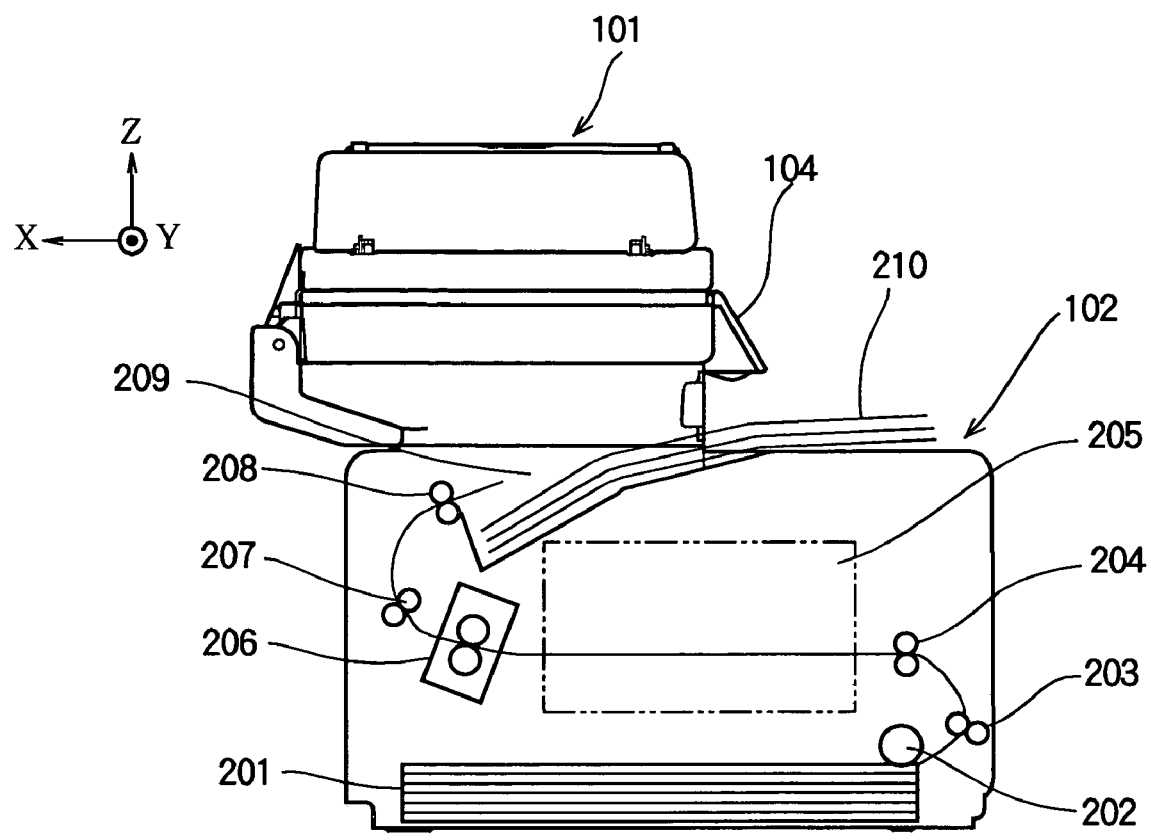
FIG. 3 is a front view of the image forming apparatus of FIG. 1.

FIG. 1 is a perspective view showing an outer configuration of an image forming apparatus 1 including an image reading apparatus according to the first embodiment of the present invention. FIG. 2 is a partially cutaway side view of the image forming apparatus 1 as seen from the negative side of X-axis. FIG. 3 is a front view of the image forming apparatus 1 as seen from the positive side of Y-axis.

In FIGS. 1, 2 and 3, the image forming apparatus 1 includes a printer section 102 (as an image forming unit) and a scanner section 101 (as an image reading apparatus) provided above the printer section 102. The printer section 102 and the scanner section 101 are integrated using a not shown structural body. As shown in FIG. 2, the scanner section 101 includes an ADF (i.e., Auto Document Feeder) section 103 as a sheet feeding apparatus for feeding a document which is to be read. In FIG. 2, the scanner section 101 is partially cut away to show a configuration of the ADF section 103 of the scanner section 101.

FIG. 3 (i.e., the front view) schematically shows a basic configuration of the printer section 102. As shown in FIG. 3, the printer section 102 includes a recording sheet storing portion 201 in which recording sheets 210 (i.e., recording media) are stored, and a feeding roller 202 that feeds the individual recording sheet 210 out of the recording sheet storing portion 201. First registration rollers 203 and second registration rollers 204 are provided for further feeding the recording sheet 210 to a printing process portion 205. The printing process portion 205 forms a toner image (i.e., forms a latent image on a photosensitive drum using an LED head, and develops the latent image with toner), and transfers the toner image to the recording sheet 210. A fixing unit 206 is provided for fixing the toner image to the recording sheet 210. First ejection rollers 207 and second ejection rollers 208 are provided for ejecting the recording sheet 210 (to which the toner image has been fixed) to the outside of the printer section 102. A recording sheet stacker portion 209 is provided for receiving the ejected recording sheets 210.

The image forming apparatus 1 has an operation panel 104. When a copy mode key (not shown) or the like of the operation panel 104 is pressed, a control unit (not shown) of the image forming apparatus 1 drives a driving motor (not shown) to rotate the feeding roller 202, the first registration rollers 203 and the second registration rollers 204. The feeding roller 202, the first registration rollers 203 and the second registration rollers 204 feed the individual recording sheet 210 along a feeding path from the recording sheet storing portion 201 toward the recording sheet stacker portion 209. When the recording sheet 210 passes the printing process portion 205, the printing process portion 205 forms the toner image (for example, according to an image of a document read by the scanner section 101), and transfers the toner image to the recording sheet 210. Further, when the recording sheet 210 passes the fixing unit 206, the fixing unit 206 fixes the toner image to the recording sheet 210. Thereafter, the ejection rollers 207 and second ejection rollers 208 eject the recording sheet 210 to the recording sheet stacker portion 209.

In this example, the printer section 102 is configured as an electrophotographic printer with the LED (Light Emitting Diode) head. However, the printer section 102 can be configured as a laser-type electrophotographic printer, an inkjet printer, a dot-matrix type printer or the like.

In FIGS. 1 through 3, X-axis, Y-axis and Z-axis are defined as follows. The X-axis is defined to be parallel to the feeding direction of the recording sheet 210 when the recording sheet 210 passes through the printing process section 205. The Y-axis is defined to be parallel to rotation axes of the respective rollers such as the feeding roller 202. The Z-axis is defined to be perpendicular to the X-axis and the Y-axis. In other figures, the X-axis, the Y-axis and the Z-axis are used to define the same directions as those in FIGS. 1 through 3. In other words, the X-axis, Y-axis and Z-axis of the respective figures indicate orientations of respective parts shown in the figures when the parts constitute the image forming apparatus 1 of FIG. 1.

Figure 4:
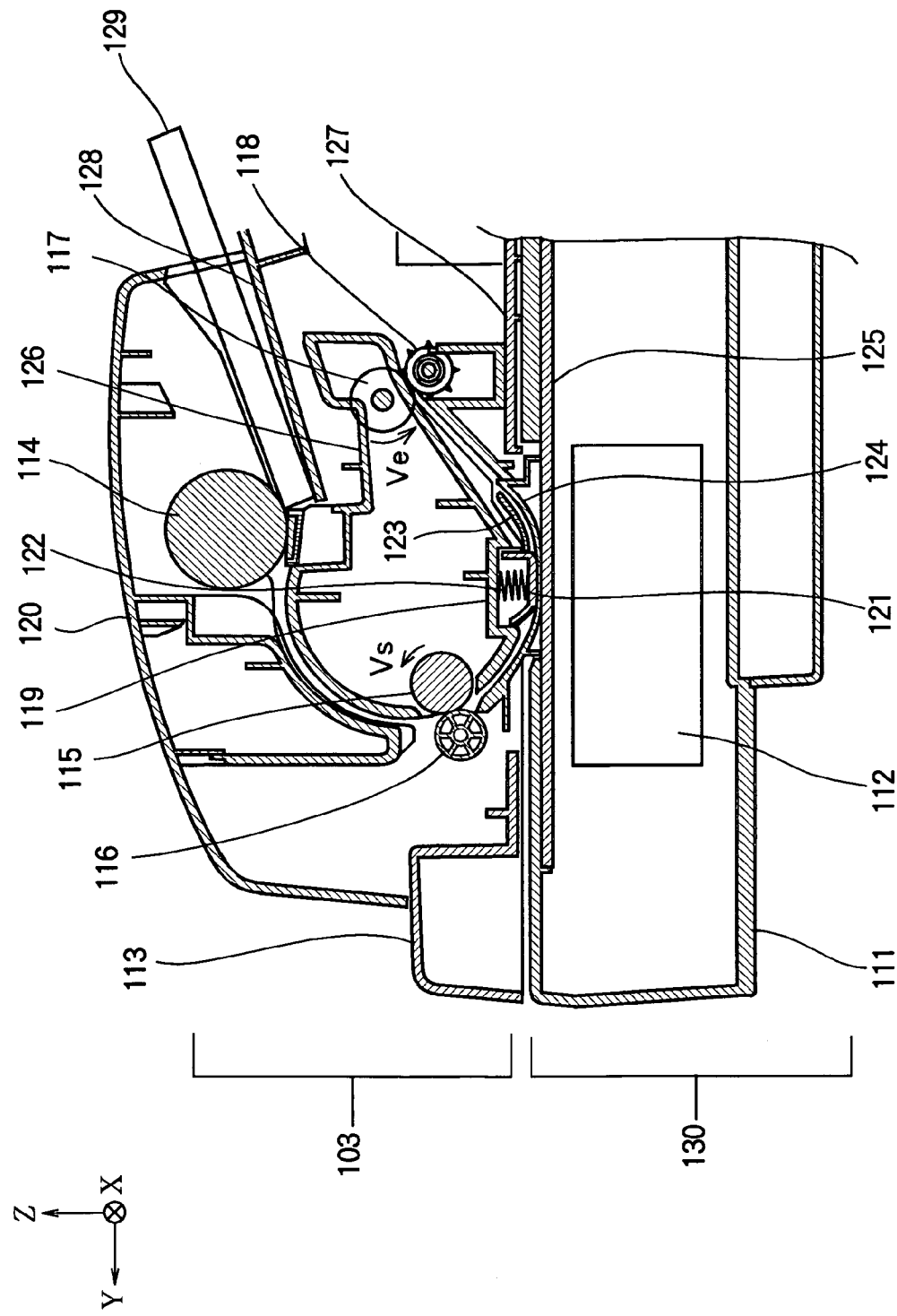
FIG. 4 is a sectional view of the image forming apparatus cut along line IV-IV in FIG. 1 for showing a scanner section of the image forming apparatus.

FIG. 4 is a sectional view taken along line IV-IV in FIG. 1, showing a part of the scanner section 101 including the ADF section 103. FIG. 4 corresponds to an enlarged view of the part of the scanner section 101 shown in section in FIG. 2.

The scanner section 101 includes a scanner base frame 111. A reading sensor 112 is provided on the scanner base frame 111, and is movably held by means of a not shown configuration. A reading surface plate 125 (for example, a glass plate) is provided above the reading sensor 112. The reading sensor 112 is hermetically enclosed in the scanner base frame 111 and the reading surface plate 125. The reading sensor 112, the scanner base frame 111 and the reading surface plate 125 constitute a scanner base portion 130. The ADF section 103 is provided on the scanner base portion 130.

The ADF section 103 includes an ADF base frame 113 and an ADF guide cover 120. A scanning pinch roller 116, an ejection pinch roller 118 and a reading surface lower guide 124 are provided on the ADF base frame 113. The reading surface lower guide 124 is composed of a transparent member. Further, an ADF lower frame 119 and an ADF upper frame 126 are provided above the ADF base frame 113. A feeding path of a document 129 (i.e., a document feeding path) is formed between the ADF lower frame 119 and the ADF base frame 113 and between the ADF upper frame 126 and the ADF guide cover 120.

On the ADF lower frame 119 and the ADF upper frame 126, an ADF roller 114, a scanning roller 115, a document holding plate 121, a document holding spring 122, a biasing assisting member 123 and an ejection roller 117 are arranged in this order from an upstream to a downstream along the document feeding path. The ADF roller 114 picks up the uppermost document 129 of a stack of the documents 129 placed on a document tray 128, and feeds the document 129 into the document feeding path. The scanning roller 115 is disposed facing the scanning pinch roller 116 so as to sandwich the document 129 therebetween. The scanning roller 115 rotates as shown by an arrow in FIG. 4 to thereby feed the document 129 along the document feeding path. The document holding plate 121 is disposed facing the reading surface lower guide 124, and holds the document 129 against the reading surface lower guide 124. The document holding spring 122 is disposed between the ADF lower frame 119 and the document holding plate 121, and biases the document holding plate 121 against the reading surface lower guide 124. The biasing assisting member 123 is displaceable in accordance with a tension of the document 129 as described later. The ejection roller 117 is disposed facing the ejection pinch roller 118 so as to sandwich the document 129 therebetween. The ejection roller 117 rotates as shown by an arrow in FIG. 4 to thereby feed the document 129 along the document feeding path and to eject the document 129 to a document ejection portion 127.

When the document 129 is fed along the document feeding path, and passes the reading surface lower guide 124, the reading sensor 112 reads an image of the document 129 via the transparent reading surface lower guide 124.

In this regard, the document holding plate 121 corresponds to a sheet holding member. The biasing assisting plate 123 corresponds to a biasing assisting member. The reading surface lower guide 124 corresponds to a sheet guide. The scanning roller 115 and the scanning pinch roller 116 correspond to a first feeding member. The ejection roller 117 and the ejection pinch roller 118 correspond to a second feeding member. The document holding spring 122 corresponds to a biasing member. The document tray 128 corresponds to a sheet placing portion. The ADF roller 114 corresponds to a sheet supplying portion. The document ejection portion 127 corresponds to a sheet ejection portion.

The document holding plate 121 is biased by the document holding spring 122 (i.e., a coil spring) against the reading surface lower guide 124 and contacts the reading surface lower guide 124. When the document 129 passes through between the document holding plate 121 and the reading surface lower guide 124, the document holding plate 121 keeps the document 129 in contact with the reading surface lower guide 124. With such a structure, the document 129 and the reading sensor 112 are kept at a predetermined distance. The ADF guide cover 120 functions as an exterior cover covering the components of the ADF section 103 and also functions a document guide. The ADF guide cover 120, a document tray 128 for placing the documents 129 and the components covered by the ADF guide cover 120 constitute the ADF section 103.

Figure 5A:
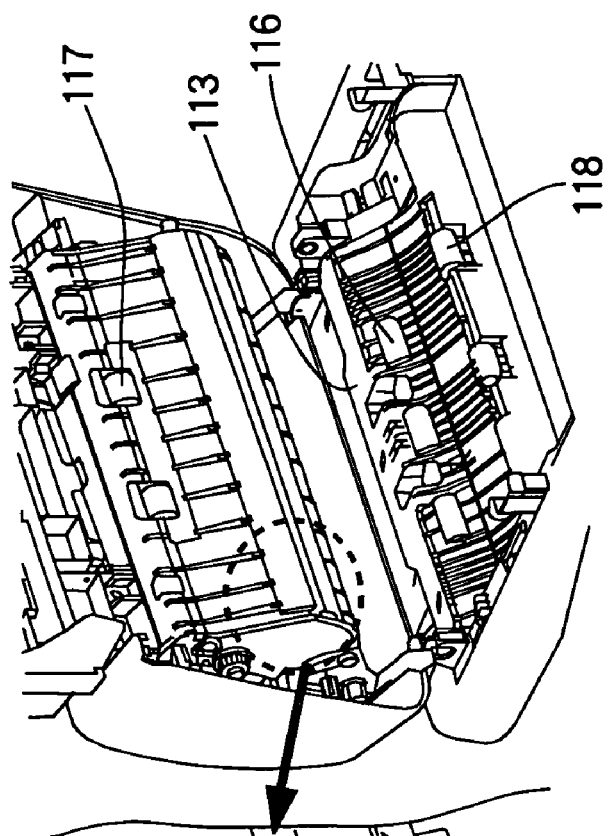
FIG. 5A is perspective view showing an internal structure of an ADF section of the image forming apparatus according to the first embodiment.
Figure 5B:
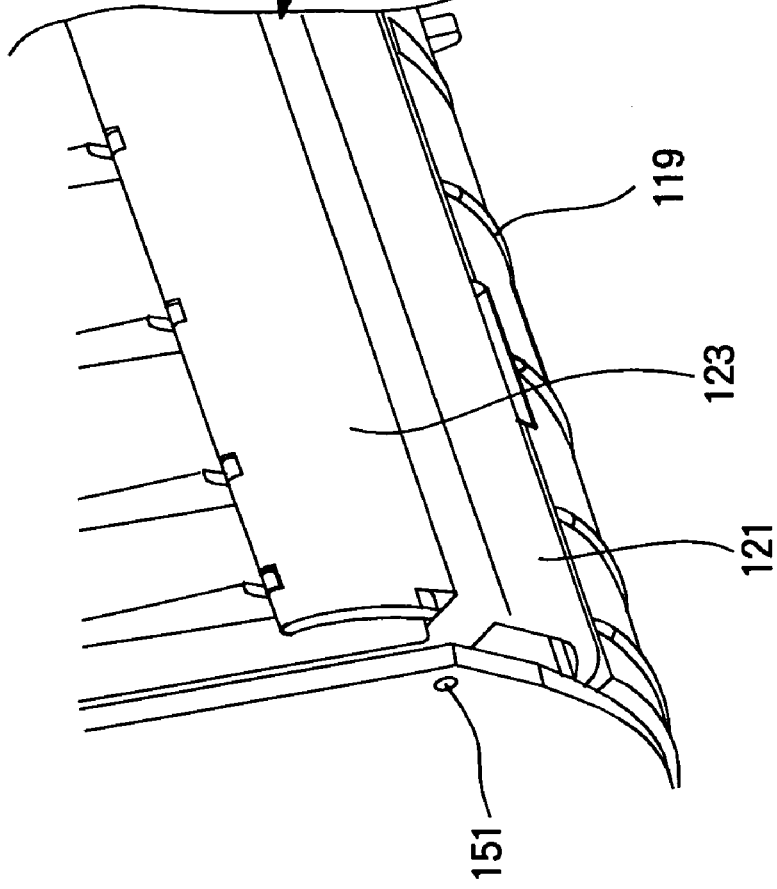
FIG. 5B is an enlarged view showing a part of the ADF section encircled by a dashed line in FIG. 5A.

The ADF lower frame 119, the ADF upper frame 126, the document tray 128 and the ADF guide cover 120 are integrally rotatable about a rotation axis (not shown) with respect to the ADF base frame 113. FIG. 5A shows the internal configuration of the ADF section 103 in a state where the ADF lower frame 119, the ADF upper frame 126, the document tray 128 and the ADF guide cover 120 are rotated to an opening position. FIG. 5B is an enlarged view of a part encircled by a dashed line in FIG. 5A. As shown in FIG. 5A, the scanning pinch roller 116, the ejection pinch roller 118 and the like are mounted to the ADF base frame 113. As shown in FIGS. 5A and 5B, the ejection roller 117, the document holding plate 121, the biasing assisting plate 123 and the like are mounted to the ADF lower frame 119. Although hidden in FIGS. 5A and 5B, the scanning roller 115 is mounted to the ADF lower frame 119.

A feeding speed of the document 129 in the ADF section 103 is determined by a circumferential speed Vs of the scanning roller 115 and a circumferential speed Ve of the ejection roller 117. In this regard, due to dimension errors of the scanning roller 115 and the ejection rollers 117, there may be variation in the circumferential speeds Vs and Ve. If a slack of the document 129 occurs between the scanning roller 115 and the ejection roller 117, the document 129 may temporarily stop at a document reading position after the document 129 passes the scanning roller 115 until the slack of the document 129 is taken up. Therefore, dimensions and tolerance of the scanning roller 115 and the ejection roller 117 are determined so that the circumferential speeds Vs and Ve satisfy the relationship: $Vs \leq Ve$.

Figure 6:
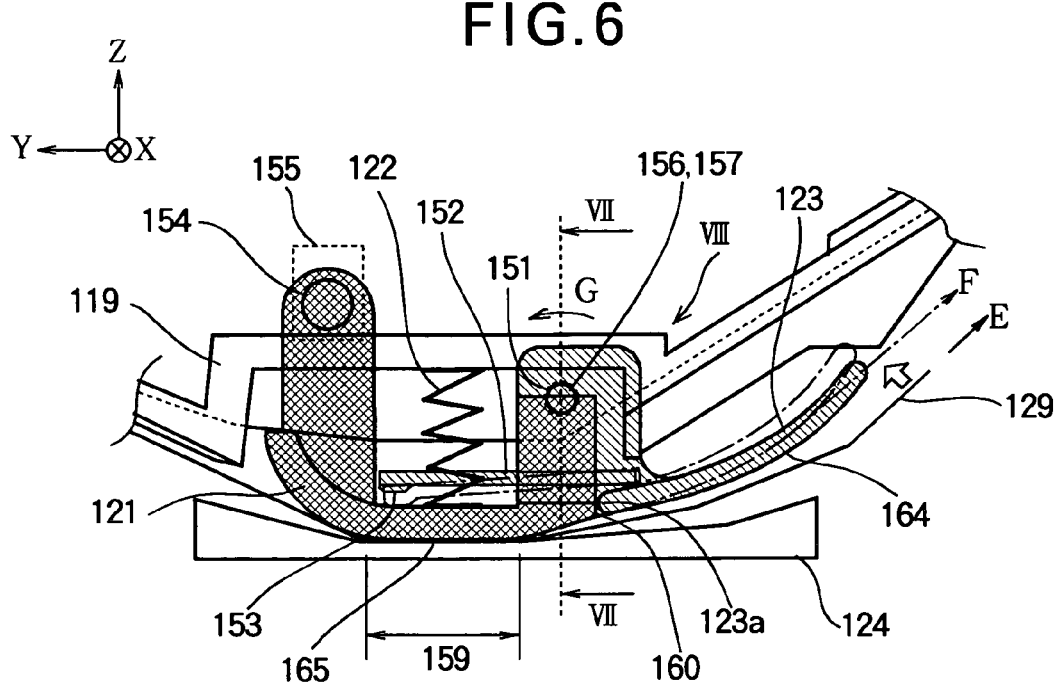
FIG. 6 is a schematic view showing an operation of a sheet feeding apparatus according to the first embodiment.
Figure 7:
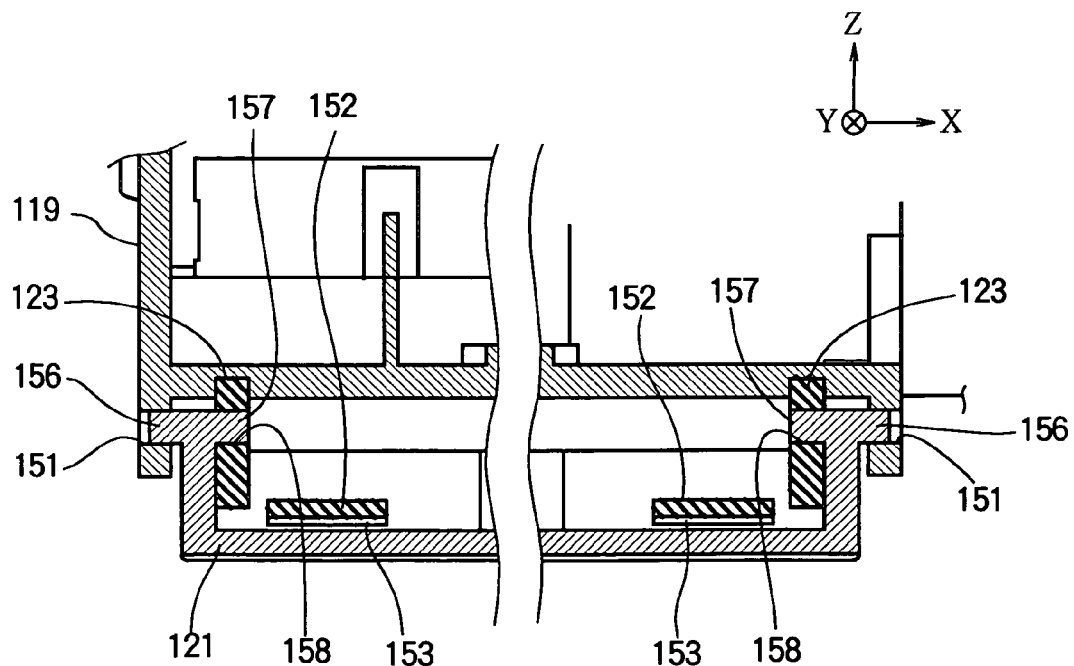
FIG. 7 is a sectional view taken along line VII-VII in FIG. 6.
Figure 8:
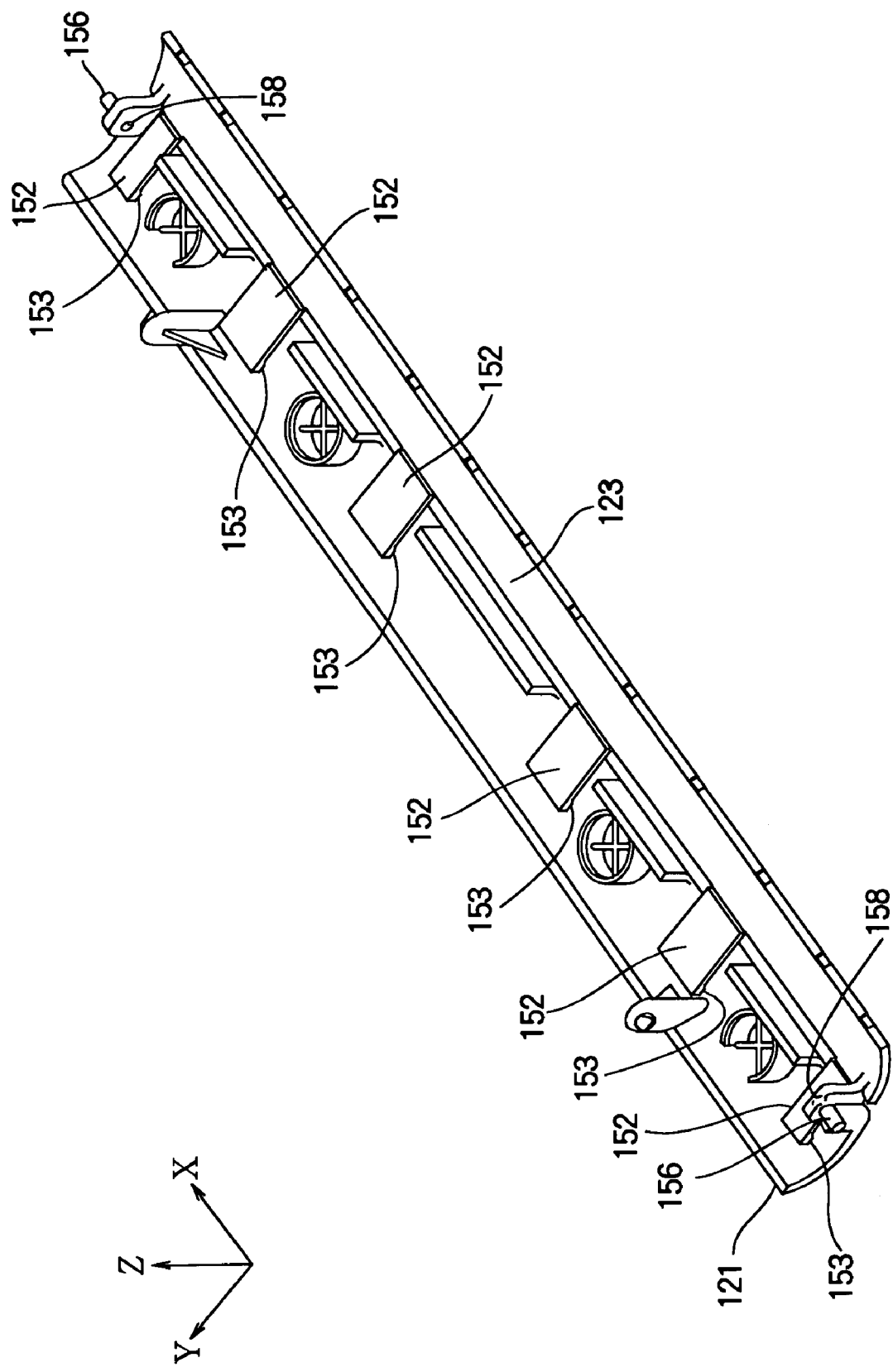
FIG. 8 is a perspective view showing a document holding plate and a biasing assisting plate as seen in a direction VIII in FIG. 6.

FIG. 6 is a schematic view showing an operation of a sheet feeding apparatus according to the first embodiment. FIG. 6 corresponds to an enlarged view of a portion around the document holding plate 121 of FIG. 4. FIG. 7 is a sectional view taken along line VII-VII in FIG. 6 passing through a document holding plate rotation shaft 156. FIG. 8 is a perspective view showing the document holding plate 121 and the biasing assisting plate 123 as seen in a direction VIII in FIG. 6.

In FIG. 6, components that are integrated with the document holding plate 121 and rotate together with the document holding plate 121 are shown with cross-hatching for convenience. Further, components that are integrated with the biasing assisting plate 123 and rotate together with the biasing assisting plate 123 are shown with oblique-hatching for convenience.

The document holding plate 121 has document holding plate rotation shafts 156 (FIG. 7) at both ends thereof in the longitudinal direction. The document holding plate rotation shafts 156 engage rotation shaft holes 151 (FIG. 7) formed on the ADF lower frame 119 so that the document holding plate 121 is rotatably supported at the rotation shaft holes 151. The document holding plate 121 also has biasing assisting plate rotation shafts 157 (FIG. 7) which are coaxial with the document holding plate rotation shafts 156. The biasing assisting plate rotation shafts 157 engage rotation holes 158 (FIG. 7) formed on the biasing assisting plate 123. With such a configuration, the document holding plate 121 and the biasing assisting plate 123 are respectively rotatable about coaxial rotation axes.

The document holding spring 122 (provided between the document holding plate 121 and the ADF lower frame 119) biases the document holding plate 121 in a direction in which a document contacting surface 165 of the document holding plate 121 is pressed against the reading surface lower guide 124. Due to the weight of the biasing assisting plate 123 (i.e., due to gravity), a contact portion 123a of the biasing assisting plate 123 contacts a holding plate contact surface 160 of the document holding plate 121, so that relative positions of the biasing assisting plate 123 and the document holding plate 121 are maintained. In this state, the document contacting surface 165 of the document holding plate 121 and a document contacting surface 164 (i.e., a sheet facing surface) of the biasing assisting plate 123 are adjacent to each other so as to form substantially continuous surfaces. The document contacting surface 164 of the biasing assisting plate 123 repeatedly contacts and separates from the document 129 according to a feeding condition of the document 129.

A biasing action portion 153 (i.e., an action portion) is provided on the biasing assisting plate 123 via a biasing resilient portion 152. To be more specific, a plurality of (for example, six) biasing action portions 153 are provided on the biasing assisting plate 123 via the same number of biasing resilient portions 152. When the biasing assisting plate 123 rotates in a direction indicated by an arrow G in FIG. 6, the biasing action portion 153 contacts and presses a backside (opposite to the document contacting surface 165) of the document holding plate 121. In a state where the contact portion 123a of the biasing assisting plate 123 contacts the holding plate contact surface 160 of the document holding plate 121, the biasing action portion 153 is kept at a predetermined distance from the document holding plate 121.

In this example, the biasing resilient portion 152 and the biasing assisting plate 123 are formed integrally with each other. However, the biasing resilient portion 152 can be composed of a plate spring, a solid rubber, a foamed rubber, a film or the like. Dimensions (such as a thickness, width and length) and number of the biasing resilient portion 152 are not limited, but can be determined in accordance with design of the respective components.

The ADF lower frame 119 has a limiter hole 155 shown by a dashed line in FIG. 6. The limiter hole 155 engages a limiter 154 provided on the document holding plate 121, and regulates a vertical movement of the document holding plate 121. The document holding plate 121 has a reading position area 159 on an upstream side (along the document feeding path) of a vertical line passing a center of the document holding plate rotation shaft 156. The reading position area 159 provides a document reading position where the document 129 is read by the reading sensor 112 (FIG. 4).

In this example, the sheet feeding apparatus of this embodiment is used to feed a document which is read by the reading sensor 112 including a CCD (i.e., Charge Coupling Device) sensor and an optical lens. However, the sheet feeding apparatus according to the present invention can also be applied to a feeding apparatus for feeding a document which is read by other reading unit, a reflection-type optical sensor (for example, a density sensor) or a high accuracy image-identifying unit.

A document feeding operation according to the first embodiment will be described with reference to FIGS. 1 through 8.

When the copy mode key or a document-scan mode key on the operation panel 104 (FIG. 2) is pressed, the control unit (not shown) of the image forming apparatus 1 sends a document reading instruction to the ADF section 103. Then, the ADF roller 114, the scanning roller 115 and the ejection roller 117 are driven by a driving motor (not shown) to rotate, and feed the document 129 along the above described document feeding path. When the document 129 reaches the reading position area 159 (FIG. 6), the reading sensor 112 reads the document 129 and transfers the image data to the control unit.

The scanning roller 115 and the ejection roller 117 (on the upstream side and downstream side of the reading position area 159) rotate at the circumferential speeds Vs and Ve satisfying the relationship Vs≦Ve as described above. Therefore, as the document 129 becomes longer, a feeding path of the document 129 between the scanning roller 115 and the ejection roller 117 shifts from a position shown by a solid line and indicted by an arrow E in FIG. 6 toward a direction in which a curvature (slack) of the document 129 decreases. As a result, the document 129 contacts the document contacting surface 164 of the biasing assisting plate 123 so as to generate a tension, and causes the biasing assisting plate 123 to rotate in the direction indicated by the arrow G.

By the rotation of the biasing assisting plate 123, the biasing action portion 153 of the biasing assisting plate 123 contacts the document holding plate 121, and causes a deflection of the biasing resilient portion 152. Due to the deflection of the biasing resilient portion 152, the biasing assisting plate 123 applies a biasing force to the document holding plate 121. In this state, the document 129 is fed along the shifted feeding path (for example, shown by a dashed dot line and indicated by an arrow F in FIG. 6) where a reaction force against the biasing force applied by the document holding plate 121 and the tension applied by contacting the document contacting surface 164 of the biasing assisting plate 213 are balanced. In this state, the biasing assisting plate 123 has rotated in the direction shown by the arrow G to reach a position shown by a dashed dot line in FIG. 6.

The document holding plate 121 is biased against the reading surface lower guide 124 by the document holding spring 122 as described above, and is applied with a biasing force (in accordance with the tension of the document 129) by the biasing action portion 153 to bias the document 129 against the reading surface lower guide 124. In other words, the biasing action of the document holding plate 121 is assisted by the biasing action portion 153 of the biasing assisting plate 123. With such a configuration, if the document holding plate 121 is urged upward due to an increased tension of the document 129, the biasing force (i.e., an auxiliary biasing force) applied to the document holding plate 121 by the biasing resilient portion 153 also increases so as to cancel a force due to the increased tension. Therefore, an influence of a variation in the tension of the document 129 is suppressed, so that the document 129 is kept in contact with the reading surface lower guide 124.

The auxiliary biasing force applied to the document holding plate 121 by the biasing action portion 153 is adjusted within a suitable range so as not to interfere with the feeding of the document 129, by adjusting a resilient force of the biasing resilient portion 152.

When a tail end of the document 129 passes the scanning roller 115, the tension of the document 129 between the scanning roller 115 and the ejection roller 117 disappears, and therefore the feeding path of the document 129 returns to the initial position shown by the arrow E from the shifted position shown by the arrow F. In this state, the deflection of the biasing resilient portion 152 disappears, and the biasing action portion 153 moves apart from the document holding plate 121. Therefore, the document holding plate 121 is biased against the reading surface lower guide 124 only by the force of the document holding spring 122, so as to keep the document 129 in contact with the reading surface lower guide 124.

With such an operation, the document holding plate 121 holds the document 129 against the reading surface lower guide 124 with the assistance of the auxiliary biasing force applied by the biasing action portion 153 in accordance with the tension of the document 129. Therefore, the biasing force of the document holding spring 122 can be set to a minimum force which is determined without taking into consideration the tension of the document 129 that varies due the thickness or the like.

As described above, according to the first embodiment of the present invention, the document holding plate 121 is prevented from shifting upward, and therefore the document 129 and the reading surface lower guide 124 are kept in contact with each other, even if the tension of the document 129 (which is being fed) increases.

Further, the biasing force generated by the document holding spring 122 can be set to a minimum force that is determined without taking into consideration the influence of the tension of the document 129. Therefore, it becomes possible to reduce a load to insert the document 129 into between the document holding plate 121 and the reading surface lower guide 124. Thus, even a thin document 129 (which is relatively weak) can be inserted into between the document holding plate 121 and the reading surface lower guide 124 without hindrance. In other words, the document 120 can be fed in a stable manner, and the ADF section 103 can deal with various kind of documents.

Moreover, a gap between the document holding plate 121 and the biasing assisting plate 123 can be set to zero, and therefore the document 129 having a tendency to curl (i.e. curling tendency) can be fed in a stable manner without causing a jam or the like in the gap.

Second Embodiment

Figure 9:
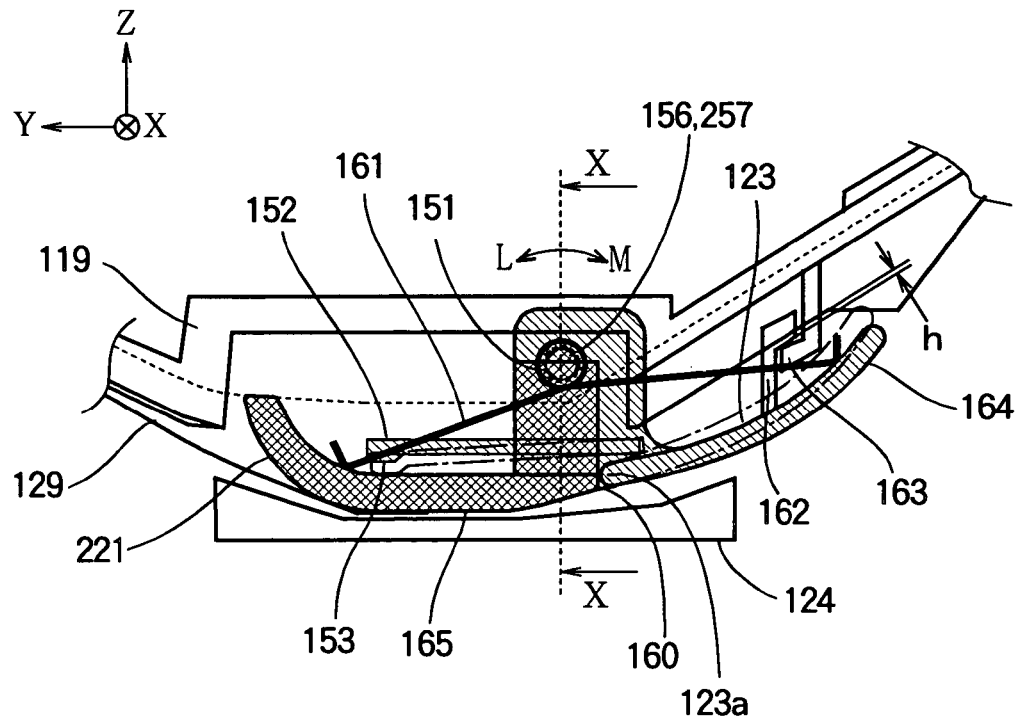
FIG. 9 is a schematic view showing an operation of a sheet feeding apparatus according to the second embodiment.
Figure 10:
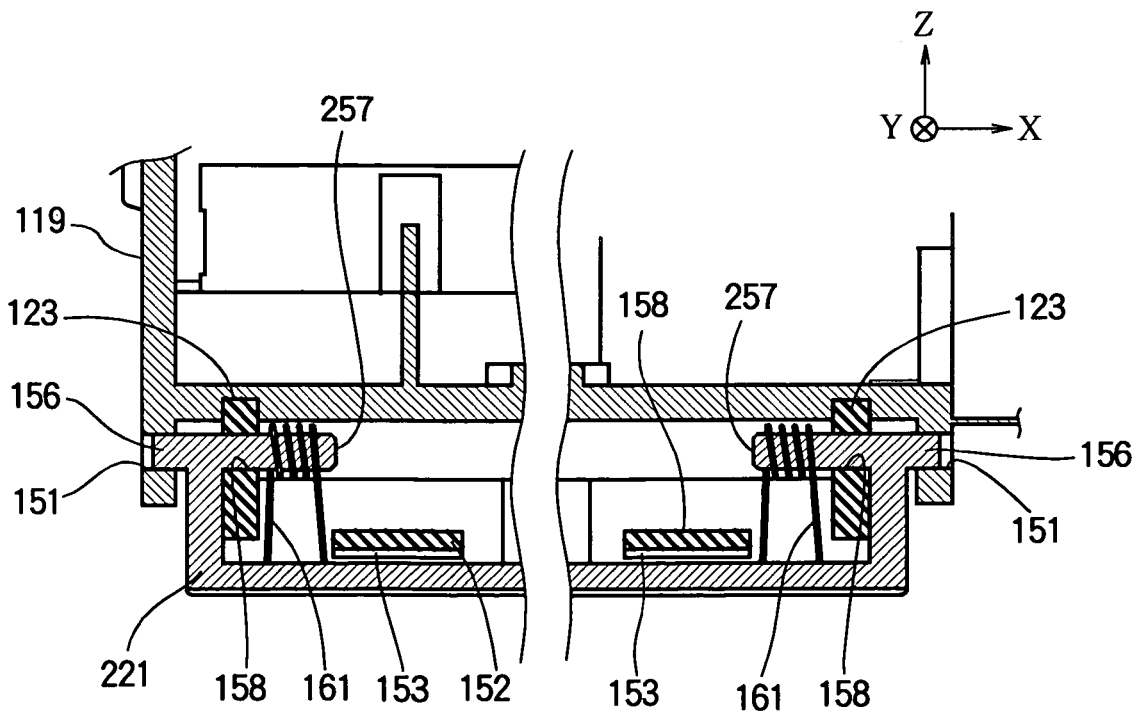
FIG. 10 is a sectional view taken along line X-X in FIG. 9.

FIG. 9 is a schematic view showing an operation of a sheet feeding apparatus according to the second embodiment of the present invention. FIG. 9 corresponds to an enlarged view of a portion around the document holding plate 121 of FIG. 4, which is different from the first embodiment as described later. FIG. 10 is a sectional view taken along line X-X in FIG. 9 passing through a document holding plate rotation shaft 156.

Unlike the sheet feeding apparatuses of the first embodiment (FIG. 6), the sheet feeding apparatus of the second embodiment has no document holding spring 122 and no limiter 154 (FIG. 6). Instead, the sheet feeding apparatus of the second embodiment has a torsion spring 161, a biasing assisting plate stopper 162 and a biasing assisting plate limiter 163 (FIG. 9).

Components of an image forming apparatus including the sheet feeding apparatus of the second embodiment which are the same as those of the image forming apparatus 1 (FIG. 1) of the first embodiment are assigned the same reference numerals, and descriptions thereof will be omitted. The following description will be focused on the difference between the first and second embodiments. Regarding the components of the image forming apparatus of the second embodiment which are the same as those of the image forming apparatus 1 of the first embodiment, FIGS. 1 through 5 will be referred as necessary.

As shown in FIG. 10, biasing assisting plate rotation shafts 257 are provided coaxially with the document holding plate rotation shafts 156. The biasing assisting plate rotation shafts 257 extend inwardly through the biasing assisting plate rotation holes 158 of the biasing assisting plate 123. The torsion springs 161 (as a resilient member) are provided on the inwardly extending portions of the biasing assisting plate rotation shafts 257. An end of each torsion spring 161 contacts the document holding plate 221, and the other end of the torsion spring 161 contacts the biasing assisting plate 123. The torsion spring 161 acts on the document holding plate 221 and the biasing assisting plate 123 so that the contact portion 123a of the biasing assisting plate 123 contacts the holding plate contact surface 160 of the document holding plate 221. Therefore, in a free state (i.e., before the document 129 is inserted between the sheet holding plate 221 and the reading surface lower guide 124), the document holding plate 221 and the biasing assisting plate 123 rotate together with each other about the rotation shaft holes 151 of the ADF lower frame 119.

In the free state, the document contact surface 165 of the document holding plate 221 is kept in contact with the reading surface lower guide 124 due to gravity. In this state, the positions of the document holding plate 221 and the biasing assisting plate 123 are referred to as initial positions.

The biasing assisting plate stopper 162 is provided on the biasing assisting plate 123, and the biasing assisting plate limiter 163 is provided on the ADF lower frame 119. The biasing assisting plate stopper 162 and the biasing assisting plate limiter 163 constitute a limiter unit. When the biasing assisting plate stopper 162 and the biasing assisting plate limiter 163 contact each other, the biasing assisting plate 123 is prevented from rotating in the direction shown by an arrow M. When the biasing assisting plate stopper 162 and the biasing assisting plate limiter 163 are in the initial positions (as described above), a gap "h" is formed between the biasing assisting plate stopper 162 and the biasing assisting plate limiter 163. In a state where the limiter unit prevents the rotation of the biasing assisting plate 123 in the direction shown by the arrow M, a predetermined gap is formed between the document contacting surface 165 of the document holding plate 221 and the reading surface lower guide 124.

In this example, the torsion spring 161 is used to apply the biasing force to cause the holding plate contact surface 160 of the document holding plate 221 and the contact portion 123a of the biasing assisting plate 123 to contact each other. However, it is also possible to use other member that can apply the biasing force to cause the holding plate contact surface 160 and the contact portion 123a to contact each other.

Next, a document feeding operation in the second embodiment will be described with reference to FIGS. 9 and 10.

In a state where the document holding plate 221 and the biasing assisting plate 123 are in the initial positions, when the document 129 is inserted into between the document holding plate 221 and the reading surface lower guide 124, the document holding plate 221 is urged upward. In this state, the document holding plate 221 and the biasing assisting plate 123 rotate together with each other in the direction indicated by the arrow M (so as to be kept in contact with each other due to the biasing force of the torsion spring 161), and therefore the gap "h" between the biasing assisting plate stopper 162 and the biasing assisting plate limiter 163 decreases. If the document 129 is relatively thin, the rotation amount of the document holding plate 221 and the biasing assisting plate 123 may be within a range in which the biasing assisting plate stopper 162 does not contact the biasing assisting plate limiter 163. In such a case, it is expressed that an apparent thickness of the document 129 is less than or equal to the gap "h".

Therefore, if the document 129 inserted between the document holding plate 221 and the reading surface lower guide 124 is relatively thin and has no curling tendency so that the apparent thickness is less than or equal to "h", the biasing force applied to the reading surface lower guide 124 (by the document holding plate 221) is given only by gravity. Since the document holding plate 221 and the biasing assisting plate 123 rotate together with each other by means of the torsion spring 161, the biasing force given by gravity depends on a positional relationship between the rotation shaft 156 and a gravity center of an integrated structure including the document holding plate 221, the biasing assisting plate 123 and the torsion spring 161. In this regard, this biasing force (given by gravity) is set to be relatively low so as to allow the thin document 129 to be smoothly inserted into between the document holding plate 221 and the reading surface lower guide 124, i.e., so as to reduce a load to insert the document 129 therebetween.

If the document 129 inserted into between the document holding plate 221 and the reading surface lower guide 124 is thick or has curling tendency so that the apparent thickness is greater than "h", the sheet holding plate 221 and the biasing assisting plate 123 rotate in the direction indicated by the arrow M until the biasing assisting plate stopper 162 contacts the biasing assisting plate limiter 163. From this state, the biasing assisting plate 123 is prevented from rotating further in the direction indicated by the arrow M. In this regard, the document holding plate 221 further rotates in the direction indicated by the arrow M in accordance with the apparent thickness of the document 129. As a result, the holding plate contact surface 160 of the document holding plate 221 departs from the biasing assisting plate 123, and the document holding plate 221 is biased against the reading surface lower guide 124 due to the biasing force of the torsion spring 161. The biasing force applied to the document holding plate 221 by the torsion spring 161 increases as the rotation amount of the document holding plate 221 in the direction indicated by the arrow M increases.

The sheet feeding apparatus according to the second embodiment has the biasing resilient portion 152 and the biasing action portion 153 provided on the biasing assisting plate 123, and has a configuration for applying the auxiliary biasing force to the document holding plate 221 in accordance with the tension of the document 129 fed between the scanning roller 115 and the ejection roller 117 (FIG. 4). These configurations are the same as those of the sheet feeding apparatus of the first embodiment, and therefore descriptions thereof will be omitted.

In the above described document feeding operation, if the document 129 has the apparent thickness less than or equal to "h" (i.e., if the document 129 is relatively thin), the document holding plate 221 reduces the load to insert the document 129 into between the document holding plate 221 and the reading surface lower guide 124 so as to allow easy insertion of the document 129. If the document 129 has the apparent thickness greater than "h" (i.e., if the document 129 is relatively thick or has curling tendency), the document holding plate 221 biases the document 129 against the reading surface lower guide 124 by means of the biasing force of the torsion spring 161 even before the auxiliary biasing force (due to the tension of the document 129) is obtained. The force with which the document holding plate 221 biases the document 129 increases according to the increase in the apparent thickness of the document 129.

As described above, according to the sheet feeding apparatus of the second embodiment, if the document 129 is relatively thin and has relatively low curling tendency (i.e., has relatively low rigidity), the load to insert the document 129 into between the document holding plate 221 and the reading surface lower guide 124 is reduced so as to allow easy insertion of the document 129. If the document 129 is relatively thick or has relatively high curling tendency (i.e., has relatively high rigidity), the document holding plate 221 biases the document 129 against the reading surface lower guide 124 by means of the biasing force in accordance with the thickness of the document 129, and therefore the upward shifting of the document 129 can be suppressed even before the auxiliary biasing force due to the tension of the document 129 is obtained (i.e., even in early stage of the insertion of the document 129). Accordingly, image reading quality can be enhanced even when the documents of various thicknesses and curling tendencies are used.

In the above described embodiments, the image forming apparatus 1 (with the scanner section 101 and printer section 102) having the sheet feeding apparatus has been described. However, the present invention is applicable to any kind of apparatus such as a copier, printer, facsimile machine or the like in which a tension is applied to a medium (such as a document or recording sheet) during the feeding of the medium and in which it is necessary to control the orientation of the medium.

While the preferred embodiments of the present invention have been illustrated in detail, it should be apparent that modifications and improvements may be made to the invention without departing from the spirit and scope of the invention as described in the following claims.

What is claimed is:

1. A sheet feeding apparatus comprising:
   a first feeding member that feeds a sheet along a predetermined feeding path;
   a second feeding member that further feeds the sheet along said feeding path, said second feeding member being provided on a downstream side of said first feeding member along said feeding path;
   a sheet guide for guiding the sheet, said sheet guide being provided between said first and second feeding members along said feeding path;
   a sheet holding member configured to face said sheet guide via said feeding path;
   a biasing member that biases said sheet holding member toward said sheet guide with a first biasing force, and
   a biasing assisting member that applies a second biasing force to said sheet holding member, the second biasing force being in accordance with a tension applied to the sheet that is fed between said first and second feeding members, said biasing assisting member pressing said sheet holding member against said sheet guide with the second biasing force so as to assist the first biasing force,
   wherein said biasing assisting member has an action portion that presses said sheet holding member when said biasing assisting member rotates in a first direction with respect to said sheet holding member,
   wherein said sheet holding member and said biasing assisting member are rotatable about the same axis, and
   wherein said biasing assisting member further comprises:
      a sheet facing surface that faces the sheet; and
      a contact portion that contacts said sheet holding member when said biasing assisting member rotates in a second direction opposite to said first direction with respect to said sheet holding member.

2. The sheet feeding apparatus according to claim 1, wherein said biasing assisting member includes a resilient portion that generates the second biasing force.

3. The sheet feeding apparatus according to claim 1, wherein the biasing member biases said sheet holding member so that said sheet holding member holds the sheet against said sheet guide.

4. The sheet feeding apparatus according to claim 3, wherein said biasing member is a spring.

5. The sheet feeding apparatus according to claim 4, wherein said biasing member is a coil spring.

6. The sheet feeding apparatus according to claim 1, further comprising:
   a resilient member provided between said sheet holding member and said biasing assisting member, said resilient member biasing said biasing assisting member in a direction in which said contact portion of said biasing assisting member contacts said sheet holding member, and
   a limiter unit that limits a rotation of said biasing assisting member accompanying a rotation of said sheet holding member when said sheet holding member rotates in a direction away from said sheet guide.

7. The sheet feeding apparatus according to claim 6, wherein said resilient member is a spring.

8. The sheet feeding apparatus according to claim 7, wherein said resilient member is a torsion spring.

9. The sheet feeding apparatus according to claim 6, wherein, in a free state where said sheet holding member and said biasing assisting member rotate together, said sheet holding member and said biasing assisting member cause said sheet facing surface to contact said sheet guide due to gravity.

10. The sheet feeding apparatus according to claim 6, wherein a predetermined gap is formed between a sheet facing surface of said sheet holding member and said sheet guide in a state where said biasing assisting member prevents said rotation of said biasing assisting member accompanying said rotation of said sheet holding member.

11. The sheet feeding apparatus according to claim 1, wherein said sheet guide is composed of a transparent material.

12. The sheet feeding apparatus according to claim 1, further comprising a reading sensor that reads the sheet via said sheet guide.

13. An image forming apparatus comprising:
    a sheet placing portion for placing a sheet thereon;
    a sheet supplying portion that supplies the sheet from said sheet placing portion;
    said sheet feeding apparatus according to claim 1, and
    a sheet ejection portion for ejecting the sheet.

14. An image reading apparatus comprising:
    a first feeding member that feeds a document along a predetermined feeding path;
    a second feeding member that further feeds said document along said feeding path, said second feeding member being provided on a downstream side of said first feeding member along said feeding path;
    a document reading unit that reads said document at a document reading position defined in said feeding path between said first and second feeding members;
    a sheet guide for guiding said document, said sheet guide being provided between said first and second feeding members along said feeding path;
    a sheet holding member configured to face said sheet guide via said feeding path at said document reading position;

a biasing member that biases said sheet holding member toward said sheet guide with a first biasing force, and a biasing assisting member that applies a second biasing force to said sheet holding member, the second biasing force being in accordance with a tension applied to said document that is fed between said first and second feeding members, said biasing assisting member pressing said sheet holding member against said sheet guide with the second biasing force so as to assist the first biasing force, wherein said biasing assisting member has an action portion that presses said sheet holding member when said biasing assisting member rotates in a first direction with respect to said sheet holding member, wherein said sheet holding member and said biasing assisting member are rotatable about the same axis, and wherein said biasing assisting member further comprises:
 a sheet facing surface that faces said document; and
 a contact portion that contacts said sheet holding member when said biasing assisting member rotates in a second direction opposite to said first direction with respect to said sheet holding member.

15. An image forming apparatus comprising:

said image reading apparatus according to claim 14, and an image forming unit that forms an image on a sheet.

* * * * *